(12) United States Patent
Gailloux et al.

(10) Patent No.: US 10,917,766 B1
(45) Date of Patent: Feb. 9, 2021

(54) SYSTEM AND METHODS FOR BRING YOUR OWN DEVICE ELIGIBILITY PLATFORM

(71) Applicant: Sprint Communications Company L.P., Overland Park, KS (US)

(72) Inventors: Michael A. Gailloux, Overland Park, KS (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/814,936

(22) Filed: Mar. 10, 2020

(51) Int. Cl.
| | |
|---|---|
| *H04M 3/00* | (2006.01) |
| *H04W 4/60* | (2018.01) |
| *H04W 4/24* | (2018.01) |
| *H04W 8/24* | (2009.01) |
| *H04W 4/50* | (2018.01) |
| *H04M 1/725* | (2021.01) |
| *H04W 88/02* | (2009.01) |

(52) U.S. Cl.
CPC ............... *H04W 4/60* (2018.02); *H04W 4/24* (2013.01); *H04W 4/50* (2018.02); *H04W 8/245* (2013.01); *H04M 1/72519* (2013.01); *H04M 1/72522* (2013.01); *H04W 88/02* (2013.01)

(58) Field of Classification Search
CPC ........... H04W 4/60; H04W 4/50; H04W 4/24; H04W 8/245
USPC ...................................... 455/419, 550.1, 405
See application file for complete search history.

(56) References Cited

U.S. PATENT DOCUMENTS

| | | | |
|---|---|---|---|
| 10,764,732 B1* | 9/2020 | Chastain | H04L 67/16 |
| 10,764,745 B2* | 9/2020 | Li | H04W 8/18 |
| 2014/0351226 A1* | 11/2014 | Christodorescu | G06F 16/24556 707/692 |
| 2016/0191523 A1* | 6/2016 | Jian | H04L 65/1016 726/4 |
| 2016/0192305 A1* | 6/2016 | Kondo | H04W 52/0251 370/350 |
| 2017/0195396 A1* | 7/2017 | Beattie, Jr. | H04L 65/1016 |
| 2017/0212920 A1* | 7/2017 | Kochan | G06F 3/067 |
| 2018/0191577 A1* | 7/2018 | Herczog | H04W 4/70 |
| 2018/0241885 A1* | 8/2018 | Baldwin | H04M 15/47 |
| 2019/0087286 A1* | 3/2019 | Kumar | G06F 11/2023 |
| 2020/0220983 A1* | 7/2020 | Hu | H04W 4/24 |

* cited by examiner

*Primary Examiner* — Danh C Le

(57) ABSTRACT

A method includes communicating, to a first mobile user equipment device, a first user application configured to at least cause the first mobile user equipment device to generate configuration data representing a configuration of the first mobile user equipment device. The method also includes making an assessment, based at least in part on the configuration data, of at least: (1) a compatibility between a communication service supported by a mobile network operator and an operational characteristic of the first mobile user equipment device, and (2) a compatibility between a second mobile user equipment device and a content characteristic of the first mobile user equipment device. The method also includes getting a plan (that is based at least in part on the assessment) for associating the first mobile user equipment device or the second mobile user equipment device with a service subscription. The method also includes communicating the plan to the first mobile user equipment device.

20 Claims, 9 Drawing Sheets

SYSTEM AND METHODS FOR BRING YOUR OWN DEVICE ELIGIBILITY PLATFORM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The present disclosure relates to telecommunications and, more particularly, to mobile communications. In the context of a mobile communications service, "bring your own device" ("BYOD") typically refers to a scenario in which a service subscriber procures, independently of the mobile network operator that provides the service, her or his own phone or other communications device for using the service. In some cases, the subscriber may bring a device that the subscriber already owns free and clear (either as a result of an outright purchase or as a result of having completed a payment plan). In other cases, the subscriber may bring a device that is still subject to a payment plan with another mobile network operator, with an expectation that the new mobile network operator will pay off the subscriber's old contract.

BYOD devices have not always been fully compatible with all services offered by all mobile network operators and, hence, in some cases some services offered by desired mobile network operators have not worked properly with the desired BYOD devices (and in some cases some services have not worked at all with the BYOD devices). Additionally, in some cases such incompatibilities have been undesirably unpredicted. Unpredicted and unapproved services limitations can drive down customer satisfaction. Moreover, in some cases transferring services from mobile-network-operator-provided ("non-BYOD") devices to BYOD devices has been undesirably time consuming and labor intensive.

SUMMARY

A method for associating one of a first mobile user equipment device and a second mobile user equipment device with a service subscription offered by a mobile network operator is disclosed. The method includes communicating, to the first mobile user equipment device, a first user application configured to at least cause the first mobile user equipment device to generate configuration data representing a configuration of the first mobile user equipment device. The method also includes making an assessment, based at least in part on the configuration data, of at least one compatibility selected from the group consisting of: (1) a compatibility between a communication service supported by the mobile network operator and an operational characteristic of the first mobile user equipment device, and (2) a compatibility between the second mobile user equipment device and a content characteristic of the first mobile user equipment device. The method also includes getting a plan, the plan being based at least in part on the assessment, for associating one of the first mobile user equipment device and the second mobile user equipment device with the service subscription. The method also includes communicating the plan to the first mobile user equipment device.

In another embodiment, a method for associating one of a first mobile user equipment device and a second mobile user equipment device with a service subscription offered by a mobile network operator is disclosed. The method includes receiving input related to associating the first mobile user equipment device or the second mobile user equipment device with the service subscription. The method also includes receiving, over the Internet, first content data representing content stored on the first mobile user equipment device. The method also includes generating, in a format compatible with the second mobile user equipment device, second content data representing the content stored on the first mobile user equipment device. The method also includes downloading the second content data over the Internet, responsive to the input, to the second mobile user equipment device.

In another embodiment, a system for associating one of a first mobile user equipment device and a second mobile user equipment device with a service subscription offered by a mobile network operator is disclosed. The system includes a memory having instructions therein. The system also includes at least one processor in communication with the memory. The at least one processor is configured to execute the instructions to communicate, to the first mobile user equipment device, a first user application configured to at least cause the first mobile user equipment device to generate configuration data representing a configuration of the first mobile user equipment device. The at least one processor is also configured to execute the instructions to make an assessment, based at least in part on the configuration data, of at least one compatibility selected from the group consisting of: (1) a compatibility between a communication service supported by the mobile network operator and an operational characteristic of the first mobile user equipment device, and (2) a compatibility between the second mobile user equipment device and a content characteristic of the first mobile user equipment device. The at least one processor is also configured to execute the instructions to get a plan, the plan being based at least in part on the assessment, for associating one of the first mobile user equipment device and the second mobile user equipment device with the service subscription. The at least one processor is also configured to execute the instructions to communicate the plan to the first mobile user equipment device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
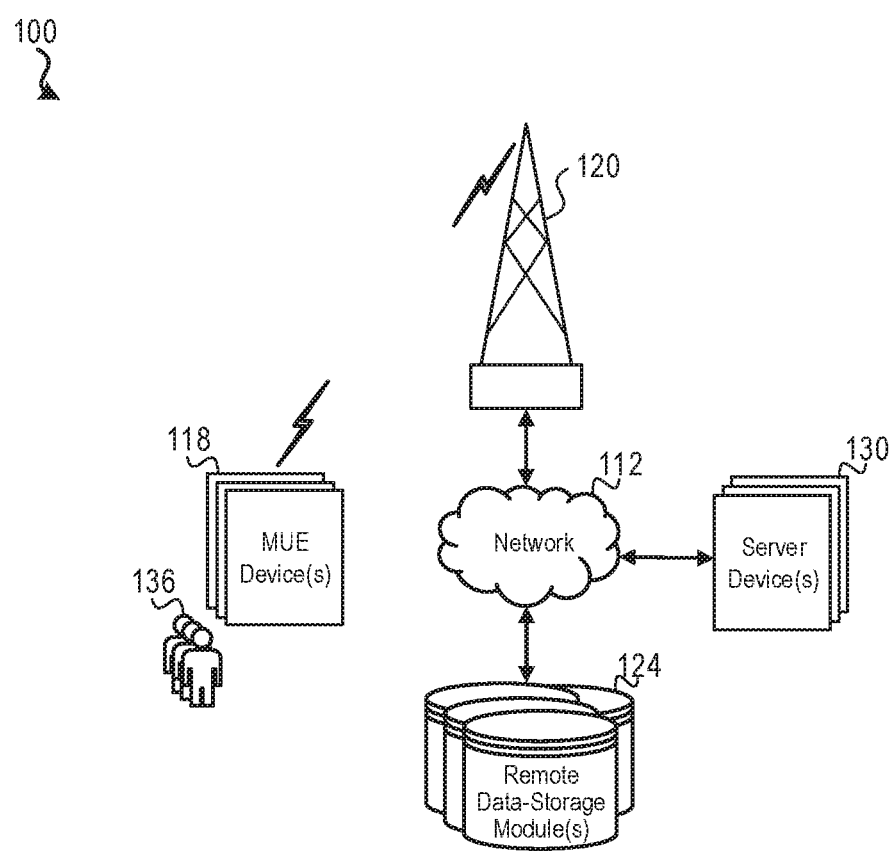
FIG. 1 is a block diagram illustrating a network environment according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Some embodiments of the disclosure may provide a mobile application that a mobile communications service subscriber (or potential subscriber) may download and install on her or his BYOD device. Some embodiments may also provide a cloud-based (i.e., Internet-based) application and a workflow application provided by a mobile network operator. The mobile application may work in conjunction with the cloud-based application, which may link to the workflow application. The workflow application may proceed through a series of investigative and diagnostic steps. After being downloaded onto the BYOD device, the mobile application may interrogate the BYOD device and learn things such as, for example but not limited to, what radio frequency ("RF") bands the BYOD device supports, what operating system is installed on the BYOD device, whether (in the case of a BYOD device that uses an Android mobile operating system) the device has been "rooted" (i.e., configured to allow user access to privileged control over various Android operating system features), whether the BYOD device meets the accessibility and/or security features/standards of a corporate or other business communications network that the BYOD device may be used to access, what contacts data are stored on the BYOD device, and what other user content (user applications, downloaded mobile applications, photos, etc.) is stored on the BYOD device. For example, if the device is determined by the workflow application to have been rooted, it may be assumed the device is insecure, and security rules identified by an enterprise may be enforced by the workflow application to block downloading enterprise applications and/or enterprise data onto the device. For example, if the device is determined by the workflow application to have been built, provisioned, or updated (e.g., user applications downloaded and installed) in contravention to security rules identified by the enterprise, the workflow application may block downloading enterprise applications and/or enterprise data onto the device.

Such information may be shared back to the workflow application for analysis. If there are incompatibilities between the BYOD device and one or more communications services supported by the desired mobile network operator (e.g., the radio bands used by the BYOD device do not align with the desired mobile network operator's spectra, and/or the BYOD device has been rooted or otherwise does not meet certain corporate/business network security features/standards, etc.), such incompatibilities can be identified and the information can be used to determine whether to transfer (or prohibit the transfer of) some or all of the communications services to the BYOD device).

In some embodiments, the mobile application may act as a vehicle for generating a plan proposal or a series of plan proposals for the subscriber (or a potential customer) for engaging her or him in the transfer to the BYOD device or for suggesting a transfer to a different device. The mobile application may also promote and broker a transfer of contacts data or other content from the previously used device to the BYOD device. The mobile application may also frankly disclose what user data may be lost in such a transfer and prompt the user to acknowledge the warning before proceeding with the transfer. The mobile application may also act as a proxy or portal to an original equipment manufacturer ("OEM") application programming interface ("API") to look up information about the BYOD pertinent to the transfer.

Some embodiments may provide yet another application, on the mobile network operator's side, that may aggregate data related to a plurality of BYOD devices into a history on the efficacy of BYOD transfers. This information may be analyzed and then fed back into the mobile application itself such that devices download and install into the workflow application, thereby improving the migration help going forwards.

Some embodiments may provide a mechanism for transferring content from a BYOD device to a virtual drive in the cloud (i.e., on the Internet), pre-preparing that content in the cloud, and facilitating transferring that content to a different device (at, for example, a mobile communications services retail facility), thereby reducing the time required for help personnel to mediate the content transfers. Some embodiments may provide much of the functionality described above to facilitate a transition of a mobile communications service from a first non-BYOD device to a second non-BYOD device.

FIG. 1 is a block diagram illustrating a network environment 100 according to an embodiment of the disclosure. The network environment 100 includes a network 112, one or more mobile user equipment ("MUE") devices 118, a cell site 120, one or more remote data-storage modules 124, one or more server devices 130, and one or more users 136. As used herein, the term "communicate" and inflections thereof mean to receive and/or transmit data or information over a communications link. The communications link may include both wired and wireless links, and may comprise a direct link or may comprise multiple links passing through one or more communications networks or network devices such as, but not limited to, routers, firewalls, servers, and switches. The communications networks may comprise any type of wired or wireless network. The networks may include private networks and/or public networks such as the Internet. Additionally, in some embodiments, the term communicate may also encompass internal communications between various components of a system and/or with an external input/output device such as a keyboard or display device. Also, a "module" as referenced herein comprises one or more hardware or electrical components such as electrical circuitry, processors, and memory that may be specially configured to perform a particular function. The memory may comprise transitory/volatile memory and/or non-transitory memory that stores data such as, but not limited to, computer executable instructions, machine code, and other various forms of data. The module may be configured to use the data to execute one or more instructions to perform one or more tasks. In certain instances, a module may also refer to a particular set of functions, software instructions, or circuitry that is configured to perform a specific task. For example, a module may comprise software components such as, but not limited to, data access objects, service components, user interface components, application programming interface ("API") components; hardware components such as electrical circuitry, processors, and memory; and/or a combination thereof. As referenced herein, computer executable instructions may be in any form including, but not limited to, machine code, assembly code, scripts, and high-level programming code written in any programming language.

The network 112 is configured to, among other things: (1) communicatively couple the one or more remote data-storage modules 124 to each other; (2) communicatively couple the one or more server devices 130 to each other; (3) communicatively couple the one or more server devices 130 to the cell site 120; (4) communicatively couple the one or more server devices 130 (through the cell site 120) to the one or more MUE devices 118; and (5) communicatively couple the one or more server devices 130 to the one or more remote data-storage modules 124. The network 112 may comprise any suitable one or more wired and/or wireless networks and/or network portions, including, but not necessarily limited to, one or more wide area networks ("WANs"), one or more metropolitan area networks ("MANs"), etc. Further, the network 112 may also comprise one or more private networks and/or network portions, and may also comprise one or more public networks and/or network portions, including, but not necessarily limited to, the Internet.

Each of the one or more MUE devices 118 is communicatively coupled to the cell site 120 and is communicatively coupled (through the cell site 120 and the network 112) to the one or more server devices 130. Each of the one or more MUE devices 118 is configured to, among other things: (1) suitably audibly, textually, and/or otherwise interact with the one or more users 136; (2) communicate with the cell site 120 according to a long term evolution ("LTE"), code division multiple access ("CDMA"), global system for mobile communications ("GSM"), fifth generation ("5G"), 5G New Radio, 5G LTE, and/or other suitable wireless telecommunications protocol(s); and (3) communicate (through the cell site 120 and the network 112) with the one or more server devices 130. Also, each of the one or more MUE devices 118 is configured to suitably implement a client method 700 (the client method 700 is not shown in FIG. 1, but see FIGS. 7A-7B) in accordance with aspects of the present disclosure. It should be appreciated that the MUE devices 118 may take various mobile forms including, but not limited to, a mobile phone, a mobile wireless handset, a mobile pager, a mobile personal digital assistant ("PDA"), a mobile gaming device, and/or a mobile media player. In some embodiments, each of the one or more MUE devices 118 may comprise a user-interface panel 200 (the user-interface panel 200 is not shown in FIG. 1, but see FIG. 2), a functional architecture 300 (the functional architecture 300 is not shown in FIG. 1, but see FIG. 3), a software environment 400 (the software environment 400 is not shown in FIG. 1, but see FIG. 4), and/or an alternative software environment 500 (the alternative software environment 500 is not shown in FIG. 1, but see FIG. 5).

The cell site 120 is communicatively coupled to the one or more MUE devices 118, is communicatively coupled to the network 112, and is communicative coupled (through the network 112) to the one or more server devices 130. The cell site 120 is configured to operate as a radio access network ("RAN") between the one or more MUE devices 118 and the network 112.

Each of the one or more remote data-storage modules 124 is communicatively coupled to the network 112 and is communicatively coupled (through the network 112) to each other and to the one or more server devices 130. The one or more remote data-storage modules 124 are configured to (alone or in combination) store and provide access to various data that may be generated, modified, and/or used in accordance with aspects of the present disclosure. In some embodiments, the one or more remote data-storage modules 124 may comprise a corresponding one or more of the computer system 880 (the computer system 880 is not shown in FIG. 1, but see FIG. 8). In some embodiments, the one or more remote data-storage modules 124 may comprise one or more suitable computers, machines, modules, and/or devices provided by an Internet service provider.

Each of the one or more server devices 130 is communicatively coupled to the network 112, is communicatively coupled (through the network 112) to each of the other one or more server devices 130, is communicatively coupled (through the network 112) to the cell site 120, is communicatively coupled (through the network 112 and the cell site 120) to the one or more MUE devices 118, and is communicatively coupled (through the network 112) to the one or more remote data-storage modules 124. Each of the one or more server devices 130 comprises any type of device that can (alone or in combination with one or more other components of the network environment 100) suitably implement a server method 600 in accordance with aspects of the present disclosure (the server method 600 is not shown in FIG. 1, but see FIGS. 6A-6B). In some embodiments, the one or more server devices 130 may comprise a corresponding one or more of the computer system 880 (the computer system 880 is not shown in FIG. 1, but see FIG. 8). In some embodiments, the one or more server devices 130 may comprise one or more suitable computers, machines, modules, and/or devices provided by an Internet service provider.

Figure 2:
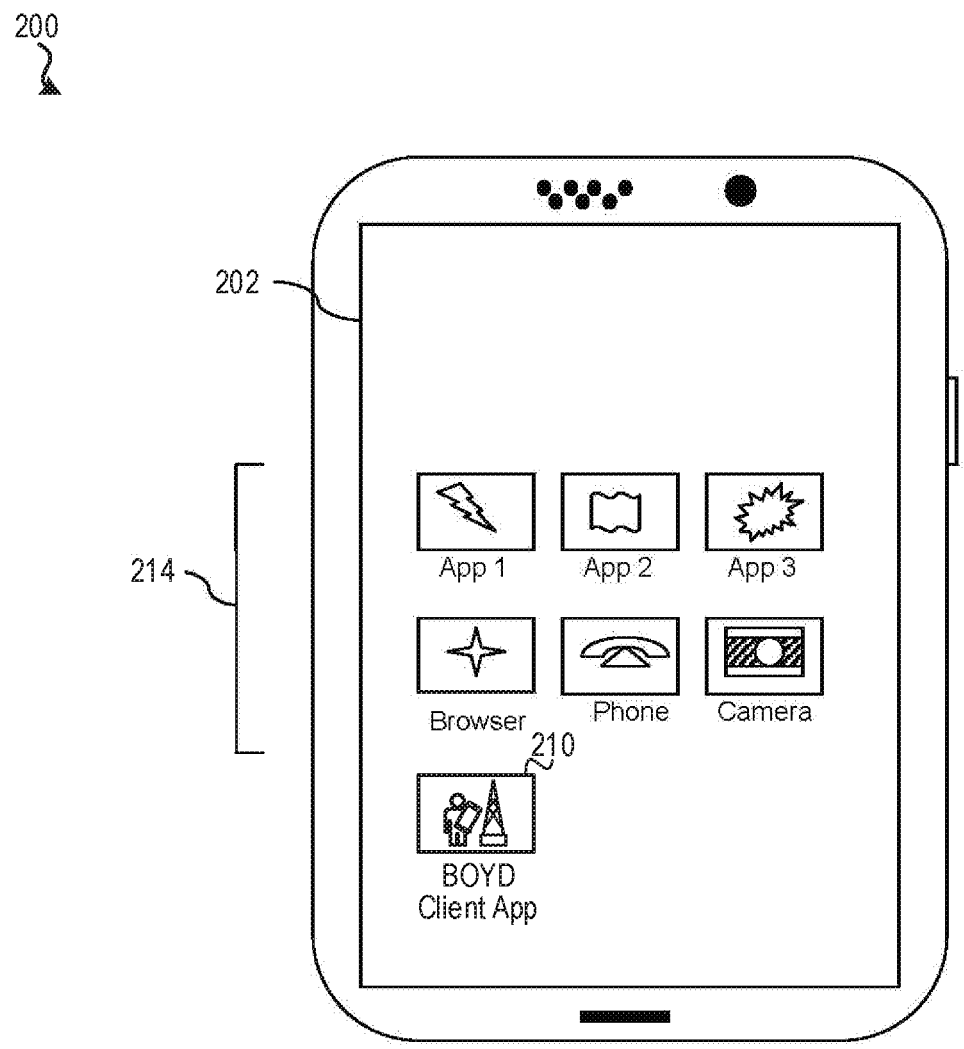
FIG. 2 illustrates a user-interface panel for one of the mobile user equipment devices of the network environment, which is operable for implementing aspects of the present disclosure.

FIG. 2 illustrates the user-interface panel 200 for one of the MUE devices 118, which is operable for implementing aspects of the present disclosure. It should be understood, however, that the present disclosure is not limited to this implementation. Though the panel 200 corresponds to a mobile phone, it should be appreciated that the MUE devices 118 may take various forms including, but not limited to, a mobile phone, a wireless handset, a pager, a personal digital assistant ("PDA"), a gaming device, and/or a media player. The panel 200 includes a touch screen display 202 having a touch-sensitive surface for input by one of the users 136. A BYOD client application ("BYOD Client App") icon 210 and small number of various other application icons 214 are illustrated within the touch screen display 202. One of the users 136 may touch the BYOD Client App icon 210 to cause the corresponding one of the MUE devices 118 to run a BYOD Client App 414 (the BYOD Client App 414 is not shown in FIG. 2, but see FIG. 4). It should be understood that in different embodiments, any number of application icons may be presented in the touch screen display 202. In some embodiments, a user may be able to download and install one or more applications on a corresponding one of the MUE devices 118, and an icon associated with each such downloaded and installed application may be added to the touch screen display 202 or to an alternative screen.

It should also be appreciated that the MUE devices 118 may have other components such as electro-mechanical switches, speakers, camera lenses, microphones, input and/or output connectors, and other components as are well known in the art. Moreover, the MUE devices 118 may present other options for the user to select, controls for the user to actuate, and/or cursors or other indicators for the user to direct. Also, it should be appreciated that the MUE devices 118 may further accept data entry from the users 136, including numbers to dial or various parameter values for configuring the operations of handsets.

Additionally, it should be appreciated that the MUE devices 118 may execute one or more software or firmware applications in response to user commands. These applications may configure the MUE devices 118 to perform various customized functions in response to interactions with the users 136. Furthermore, it should be understood that, notwithstanding the panel 200, the MUE devices 118 may be programmed and/or configured over-the-air, for example from a wireless base station, a wireless access point, or peer MUE devices 118.

Also, any of the MUE devices 118 may execute a web browser application which enables the touch screen display 202 to show a web page. The web page may be obtained via wireless communications with a base transceiver station, a wireless network access node, a peer of one of the MUE devices 118 or any other wireless communications network or system.

Figure 3:
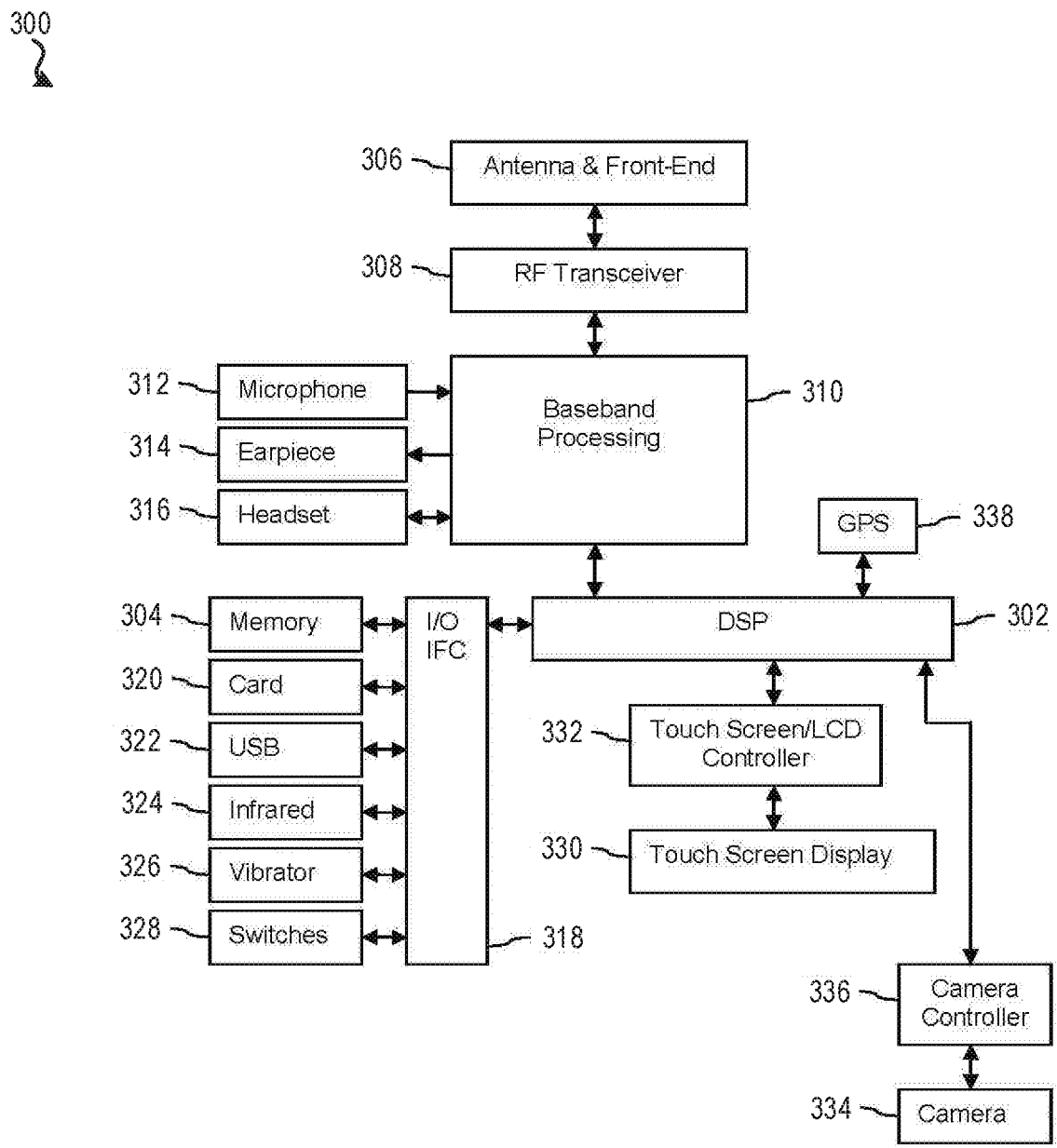
FIG. 3 is a block diagram illustrating a functional architecture for one of the mobile user equipment devices.

FIG. 3 is a block diagram illustrating a functional architecture 300 for one of the MUE devices 118. While a variety of known components of handsets are depicted, in an embodiment a subset of the listed components and/or additional components not listed may be included in any of the MUE devices 118. The illustrated one of MUE devices 118 includes a digital signal processor ("DSP") 302 and a memory 304. As shown, the illustrated one of the MUE devices 118 may further include an antenna and front-end unit 306, a radio frequency ("RF") transceiver 308, a baseband processing unit 310, a microphone 312, an earpiece speaker 314, a headset port 316, an input/output ("I/O") interface 318, a removable memory card 320, a universal serial bus ("USB") port 322, an infrared port 324, a vibrator 326, one or more electro-mechanical switches 328, a touch screen liquid crystal display ("LCD") with a touch screen display 330, a touch screen/LCD controller 332, a camera 334, a camera controller 336, and a global positioning system ("GPS") receiver 338. In some embodiments, the one of the MUE devices 118 may include another kind of display that does not provide a touch sensitive screen. In some embodiments, the one of the MUE devices 118 may include both the touch screen display 330 and an additional display component that does not provide a touch sensitive screen. In some embodiments, the DSP 302 may communicate directly with the memory 304 without passing through the input/output interface 318. Additionally, in some embodiments, the one of the MUE 118 may comprise one or more other peripheral devices that provide other functionality.

The DSP 302 or some other form of controller or central processing unit operates to control the various components of the illustrated one of the MUE devices 118 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The DSP 302 may communicate with a wireless network via the analog baseband processing unit 310. In some embodiments, the communications may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB port 322 and the infrared port 324. The USB port 322 may enable the illustrated one the MUE devices 118 to function as a peripheral device to exchange information with a personal computer or other computer system. The infrared port 324 and other optional ports such as a Bluetooth® interface or Institute of Electrical and Electronics Engineers (IEEE) 802.11 compliant wireless interface may enable the illustrated one of MUE devices 118 to communicate wirelessly with other nearby handsets and/or wireless base stations. In some embodiments, any of the MUE devices 118 may comprise a near field communications ("NFC") transceiver. The NFC transceiver may be used to complete payment transactions with point-of-sale terminals or other communications exchanges. In some embodiments, any of the MUE devices 118 may comprise a radio frequency identify ("RFID") reader and/or writer device.

The switches 328 may couple to the DSP 302 via the input/output interface 318 to provide one mechanism for the user to provide input to the illustrated one of the MUE devices 118. Alternatively, one or more of the switches 328 may be coupled to a motherboard of the MUE 118 and/or to components of the illustrated one of the MUE devices 118 via a different path (e.g., not via the input/output interface 318), for example coupled to a power control circuit (power button) of the illustrated one of the MUE devices 118. The touch screen display 330 is another input mechanism, which further displays text and/or graphics to a corresponding one of the users 136. The touch screen LCD controller 332 couples the DSP 302 to the touch screen display 330. The GPS receiver 338 is coupled to the DSP 302 to decode global positioning system signals, thereby enabling the illustrated one of the MUE devices 118 to determine its position.

Figure 4:
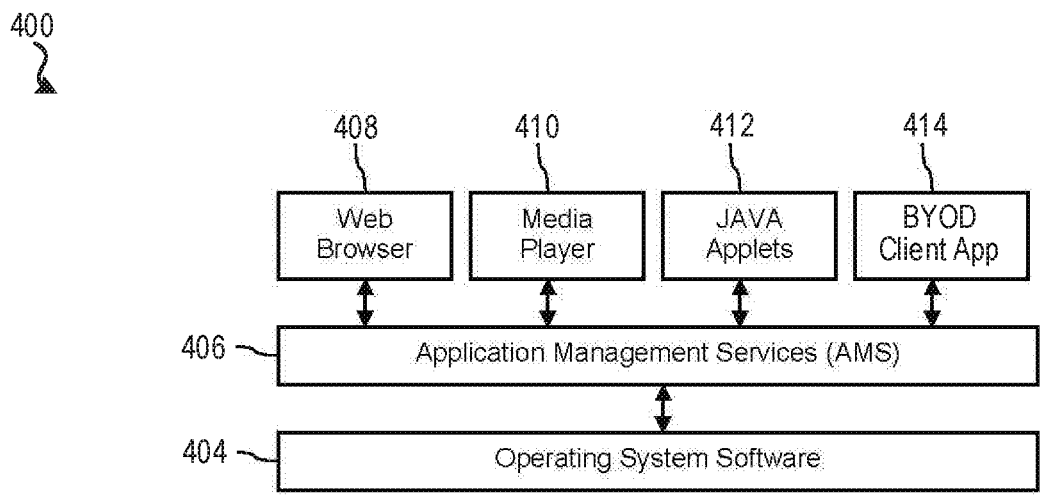
FIG. 4 illustrates a software environment that may be implemented by the digital signal processor of one of the mobile user equipment devices.

FIG. 4 illustrates a software environment 400 that may be implemented by the DSP 302. In the software environment 400, the DSP 302 executes operating system software 404 that provides a platform from which the rest of the software operates. The operating system software 404 may provide a variety of drivers for the handset hardware with standardized interfaces that are accessible to application software. The operating system software 404 may be coupled to and interact with application management services ("AMS") 406 that transfer control between various applications (including but not necessarily limited to a web browser application 408, a media player application 410, JAVA applets 412, and a BYOD client application ("BYOD Client App") 414) running on a corresponding one of the MUE devices 118. The web browser application 408 may be executed by the corresponding one of the MUE devices 118 to browse content and/or the Internet, for example when the corresponding one of the MUE devices 118 is coupled to a network via a wireless link. The web browser application 408 may permit a user to enter information into forms and select links to retrieve and view web pages. The media player application 410 may be executed by the corresponding one of the MUE devices 118 to play audio or audiovisual media. The JAVA applets 412 may be executed by the corresponding one of the MUE devices 118 to provide a variety of functionality including games, utilities, and other functionality. The BYOD Client App 414 may be executed by the corresponding one of the MUE devices 118 to perform the client method 700 (the client method 700 is not shown in FIG. 1, but see FIGS. 7A-7B).

Figure 5:
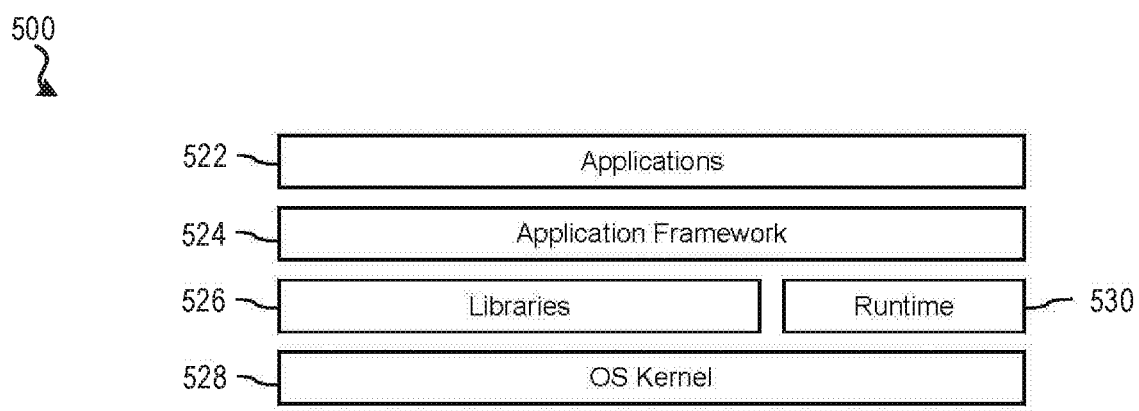
FIG. 5 illustrates an alternative software environment that may be implemented by the digital signal processor.

FIG. 5 illustrates an alternative software environment 500 that may be implemented by the DSP 302. In the alternative software environment 500, the DSP 302 executes operating system kernel ("OS kernel") 528 and an execution runtime 530. The DSP 302 executes various applications 522 (including but not necessarily limited to applications like the web browser application 408, the media player application 410, the JAVA applets 412, and the BYOD Client App 414) that may execute in the execution runtime 530 and may rely upon services provided by the application framework 524. The applications 522 and the application framework 524 may rely upon functionality provided via the libraries 526.

Figure 6A:
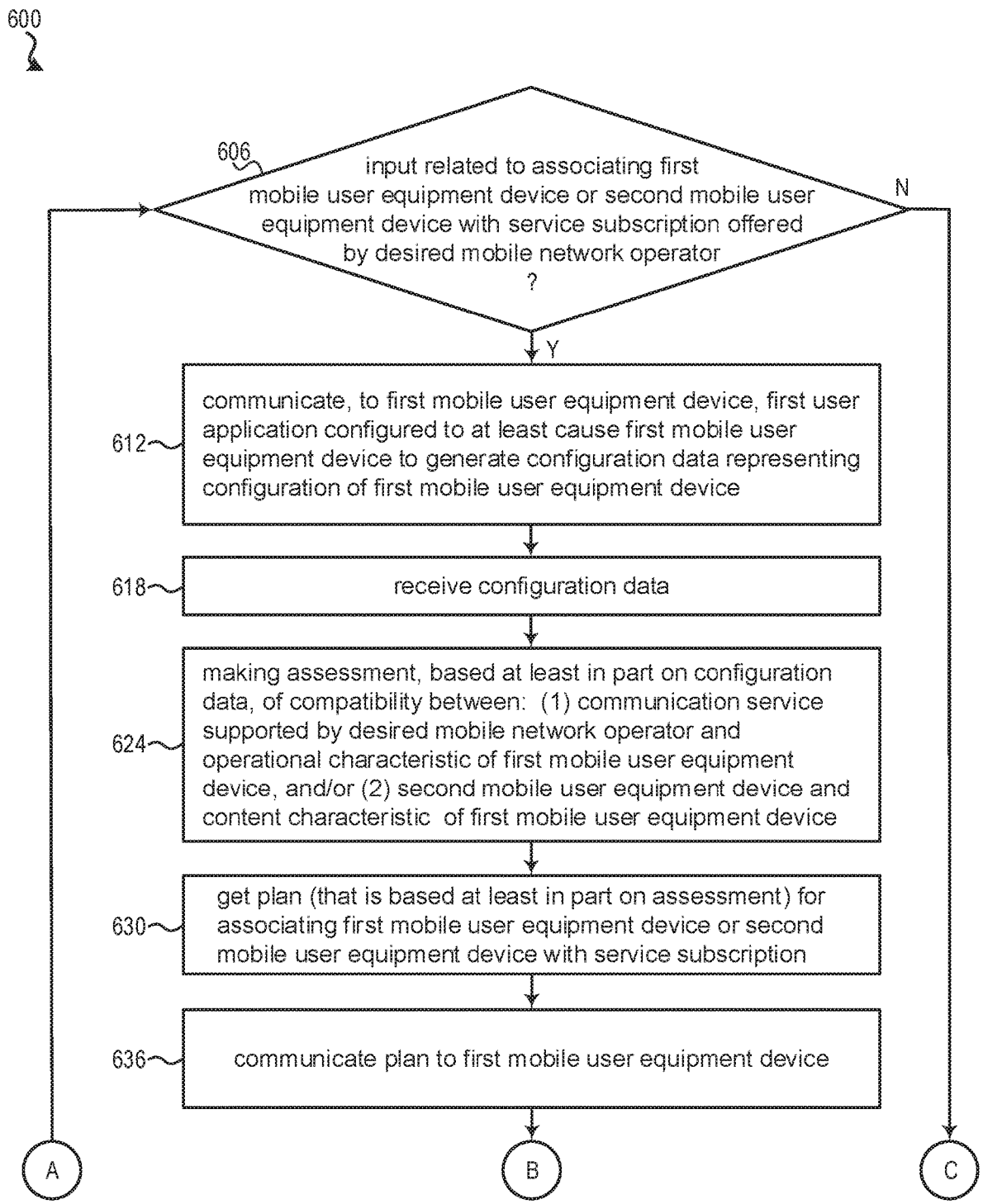
FIGS. 6A-6B are a flow chart illustrating a server method according to an embodiment of the disclosure.
Figure 6B:
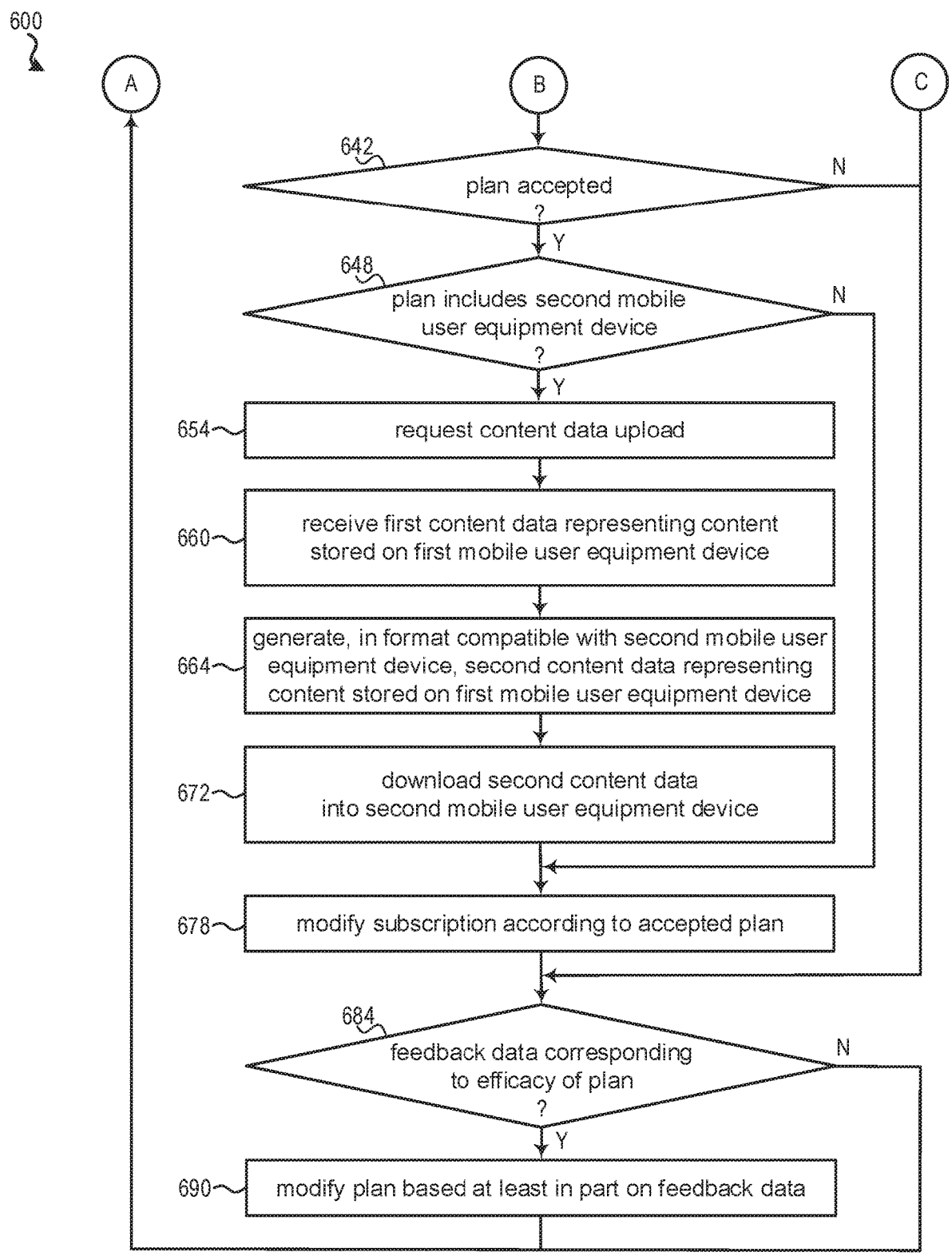

FIGS. 6A-6B are a flow chart illustrating a server method 600 according to an embodiment of the disclosure. In some instances, one or more steps of the method 600 may be performed by one or more of the systems and/or components described herein. For clarity of exposition, the following description may refer to one or more of such systems and/or components. Nevertheless, it should be appreciated that the method 600 and/or any one or more of its particular steps may be performed by any suitable system(s) and/or component(s). It should also be appreciated that the method 600 may be performed concurrently or substantially concurrently with any other method(s) and/or process(es) described herein.

At step 606, the method 600 determines whether input related to associating a first mobile user equipment device or a second mobile user equipment device with a service subscription offered by a desired mobile network operator has been received. For example, when using the network environment 100, one of the server devices 130 may monitor its communications queue(s) for a communication from one of the MUE devices 118 indicating that a corresponding one of the users 136 has made an input into that one of the MUE devices 118 corresponding to: (1) an interest in bringing that one of the MUE devices 118 into a new service subscription with a mobile network operator that has not been providing services to/through that one of the MUE devices 118 (i.e., indicating that one of the users 136 wants to bring her or his own device into a new relationship with a different mobile network operator than the mobile network operator that has been providing services to that device, or, i.e., the user wants to switch carriers but keep the same device); (2) an interest in using some other BYOD device or a mobile network operator provided device to replace that one of the MUE devices 118 in/on an existing service subscription with a mobile network operator that has been providing services to/through that one of the MUE devices 118 (i.e., the user wants to switch devices but keep the same carrier); or (3) any other suitable communication related to associating a first mobile user equipment device or a second mobile user equipment device with a service subscription offered by the desired mobile network operator. If the method 600 determines that input related to associating a first mobile user equipment device or a second mobile user equipment device with a service subscription offered by the desired mobile network operator has been received, then the method 600 goes to step 612; otherwise, the method 600 goes to step 684 (described below).

At step 612, the method 600 communicates, to the first mobile user equipment device, a first user application configured to at least cause the first mobile user equipment device to generate configuration data representing a configuration of the first mobile user equipment device. For example, when using the network environment 100, one of the server devices 130 may download, through (i.e., "over") the network 112 and the cell site 120, to the one of the MUE devices 118 (referred to above, e.g., at step 606), a user application that is configured to at least cause that one of the MUE devices 118 to generate configuration data identifying and/or representing the radio-frequency communications bands supported by that one of the MUE devices 118, the operating system, user application(s), contacts information, photographs, and/or other content running and/or stored on that one of the MUE devices 118, whether that one of the MUE devices 118 has been rooted, whether that one of the MUE devices 118 is configured to access any corporate/business networks (and, if so, which such networks), and/or any other suitable configuration of that one of the MUE devices 118. After step 612, the method 600 goes to step 618 (described below).

At step 618, the method 600 receives the configuration data. For example, when using the network environment 100, one of the MUE devices 118 may upload the configuration data (referred to above, e.g., at step 612), through (i.e., "over") the cell site 120 and the network 112, to one of the server devices 130. And, hence, that one of the server devices 130 may receive the configuration data. After step 618, the method 600 goes to step 624 (described below).

At step 624, the method 600 makes an assessment, based at least in part on the configuration data, of at least one compatibility between: (1) a communication service supported by the desired mobile network operator and an operational characteristic of the first mobile user equipment device, and/or (2) the second mobile user equipment device (if switching to a second mobile user equipment device is desired) and a content characteristic of the first mobile user equipment device.

For example, when using the network environment 100: (1) one of the server devices 130 may compare some of the configuration data (referred to above, e.g., at step 612 and step 618) identifying the radio-frequency communications bands and/or protocols supported by the corresponding one of the MUE devices 118 to data identifying the radio-frequency communications bands and/or protocols supported by the desired mobile network operator, or may compare some of the configuration data indicating whether the BYOD device has been rooted or otherwise does not meet security features/standards of one or more enterprise/corporate/business networks (and/or may compare any other suitable operational configuration data to data regarding any other suitable characteristic of the desired mobile network operator) to determine an extent to which the corresponding one of the MUE devices 118 is compatible (or conversely, is incompatible) with a communication service supported by the desired mobile network operator; and/or (2) one of the server devices 130 may compare some of the configuration data (referred to above, e.g., at step 612 and step 618) identifying and/or representing the operating system, user application(s), contacts information, photographs, and/or other content running and/or stored on that one of the MUE devices 118 to data identifying the operating system, user applications, data types, storage capacity, etc. supported by a second mobile user equipment device (and/or may compare any other suitable content configuration data to data regarding any other suitable characteristic of the second mobile user equipment device) to determine an extent to which the content stored on the corresponding one of the MUE devices 118 is suitably compatible (or conversely, is incompatible) with the second mobile user equipment device. After step 624, the method 600 goes to step 630 (described below).

At step 630, the method 600 gets a plan (that is based at least in part on the assessment) regarding the extent to which the first mobile user equipment device or the second mobile user equipment device should be permitted to become associated with the service subscription. For example, when using the network environment 100, when the method 600 has determined (at step 624, above) that one of two radio-frequency communications bands supported by the corresponding one of the MUE devices 118 is not one of two radio-frequency communications bands supported by the desired mobile network operator, one of the server devices 130 may retrieve a plan (from a local memory or from the one or more remote data-storage modules 124) that calls for nevertheless bringing that one of the MUE devices 118 into association with a particular service subscription offered by the desired mobile network operator if the corresponding one of the users 136 will accept any potential service limitations and/or compromises that may result from being limited to the one radio-frequency band. Or, for example, when using the network environment 100, when the method 600 has determined (at step 624, above) that none of the radio-frequency communications bands supported by the corresponding one of the MUE devices 118 is supported by the desired mobile network operator, one of the server devices 130 may retrieve a plan (from a local memory or from the one or more remote data-storage modules 124) that calls for associating/using a different mobile user equipment device (which, in some cases, may be a new mobile user equipment device supplied by the desired mobile network operator rather than a BYO device) with a particular service subscription offered by the desired mobile network operator.

Or, for example, when using the network environment 100, when the method 600 has determined (at step 624, above) that the corresponding one of the MUE devices 118 does not meet the security features/standards of an enterprise/corporate/business network to which it would gain access if allowed, one of the server devices 130 may retrieve a plan (from a local memory or from the one or more remote data-storage modules 124) that calls for rejecting that one of the MUE devices 118 and instead associating/using a different mobile user equipment device (which, in some cases, may be a new mobile user equipment device supplied by the desired mobile network operator rather than a BYO device) with a particular communication service offered by the desired mobile network operator.

Or, for example, when using the network environment 100, when the method 600 has determined (at step 624, above) that one or more user applications, one or more data files, and/or other content running and/or stored on the corresponding one of the MUE devices 118 is not compatible with the desired second mobile user equipment device (if a second mobile user equipment device is desired), one of the server devices 130 may retrieve a plan (from a local memory or from the one or more remote data-storage modules 124) that calls for uploading the content from the one of the MUE devices 118 to one of the server devices 130 or the one or more remote data-storage modules 124, further calls for converting the content into a form compatible with the desired second mobile user equipment device, and further calls for downloading the converted content to the second mobile user equipment device. After step 630, the method 600 goes to step 636 (described below).

At step 636, the method 600 communicates the plan to the first mobile user equipment device. For example, when using the network environment 100, one of the server devices 130 may communicate the plan (referred to above, e.g., at step 630) to the one of the MUE devices 118 that has indicated (at step 606, above) that the corresponding one of the users 136 has expressed an interest in associating that one of the MUE devices 118 or a second mobile user equipment device with the service subscription offered by the desired mobile network operator. After step 636, the method 600 goes to step 642 (described below).

At step 642, the method 600 determines whether the plan has been accepted. For example, when using the network environment 100, one of the server devices 130 may monitor its communications queue(s) for a communication, from the one of the MUE devices 118 that has indicated (at step 606, above) that the corresponding one of the users 136 has expressed an interest in associating that one of the MUE devices 118 or a second mobile user equipment device with the service subscription offered by the desired mobile network operator, indicating that one of the users 136 has made an input into that one of the MUE devices 118 expressing acceptance of the plan (communicated at step 636, above) for associating that one of the MUE devices 118 or a second mobile user equipment device with the service subscription. It should be appreciated that the method 600 (e.g., via one of the server devices 130) may also store a record of the plan acceptance (e.g., in a suitable local memory and/or in the one or more remote data-storage modules 124). If the method 600 determines that the plan has been accepted, then the method 600 goes to step 648; otherwise, the method 600 goes to step 684 (described below).

At step 648, the method 600 determines whether the plan includes associating a second mobile user equipment device with a service subscription offered by the desired mobile network operator. For example, when using the network environment 100, one of the server devices 130 may examine the plan (communicated at step 636, above) and determine whether the plan includes associating a second mobile user equipment device with a service subscription offered by the desired mobile network operator. If the method 600 determines that the plan includes associating a second mobile user equipment device with a service subscription offered by the desired mobile network operator, then the method 600 goes to step 654; otherwise, the method 600 goes to step 678 (described below).

At step 654, the method 600 requests a content data upload. For example, when using the network environment 100, one of the server devices 130 may communicate, to the one of the MUE devices 118 that has indicated (at step 606, above) that the corresponding one of the users 136 has expressed an interest in associating that one of the MUE devices 118 or a second mobile user equipment device with the service subscription offered by the desired mobile network operator, a request for content data identifying and/or representing the operating system, user application(s), contacts information, photographs, and/or other content running and/or stored on that one of the MUE devices 118. After step 654, the method 600 goes to step 660 (described below).

At step 660, the method 600 receives first content data representing the content stored on the first mobile user equipment device. For example, when using the network environment 100, the one of the MUE devices 118 (referred to above, e.g., at step 654) may communicate the content data (requested at step 654, above) to one of the server devices 130. And, hence, that one of the server devices 130 may receive the content data. It should be appreciated that the method 600 (e.g., via one of the server devices 130) may also store (e.g., in a suitable local memory and/or in the one or more remote data-storage modules 124) the content data. After step 660, the method 600 goes to step 664 (described below).

At step 664, the method 600 generates, in a format compatible with the second mobile user equipment device, second content data representing the content stored on first mobile user equipment device. For example, when using the network environment 100, one of the server devices 130 may convert the first content data (received at step 660, above) into second content data that is in one or more respective formats that are compatible with the second mobile user equipment device. After step 664, the method 600 goes to step 672 (described below).

At step 672, the method 600 downloads the second content data to the second mobile user equipment device. For example, when using the network environment 100, one of the server devices 130 may download the second content data (generated at step 664, above), through (i.e., "over") the network 112 and the cell site 120, to the second mobile user equipment device. After step 672, the method 600 goes to step 678 (described below).

At step 678, the method 600 modifies, according to the accepted plan, the service subscription offered by the desired mobile network operator. For example, when using the network environment 100, one of the server devices 130 may access the service subscription (e.g., from a suitable local memory or from the one or more remote data-storage modules 124), may modify the service subscription according to the accepted plan (referred to above, e.g., at steps 630-648), and may store the new/modified service subscription in a suitable local memory or in the one or more remote data-storage modules 124. After step 678, the method 600 goes to step 684 (described below).

At step 684, the method 600 determines whether feedback data corresponding to an efficacy of the plan has been received. For example, when using the network environment 100, one of the server devices 130 may host (in a suitable local memory or in the one or more remote data-storage modules 124) and monitor an application that solicits and receives trouble reports, customer survey results, and/or other information regarding the efficacy of the plan that has been implemented for associating the one of the MUE devices 118 or a second mobile user equipment device with the service subscription offered by the desired mobile network operator. If the method 600 determines that feedback data corresponding to an efficacy of the plan has been received, then the method 600 goes to step 690; otherwise, the method 600 goes to step 606 (described above).

At step 690, the method 600 modifies the plan based at least in part on the feedback data. For example, when using the network environment 100, one of the server devices 130 may suitably analyze the feedback data (referred to above, e.g., at step 684) and use the results of the analyses to improve the plan that has been implemented for associating the one of the MUE devices 118 or a second mobile user equipment device with the service subscription offered by the desired mobile network operator, such that the next time the plan is used one or more problems revealed by the feedback data will be less likely to occur. After step 690, the method 600 goes to step 606 (described above).

Figure 7A:
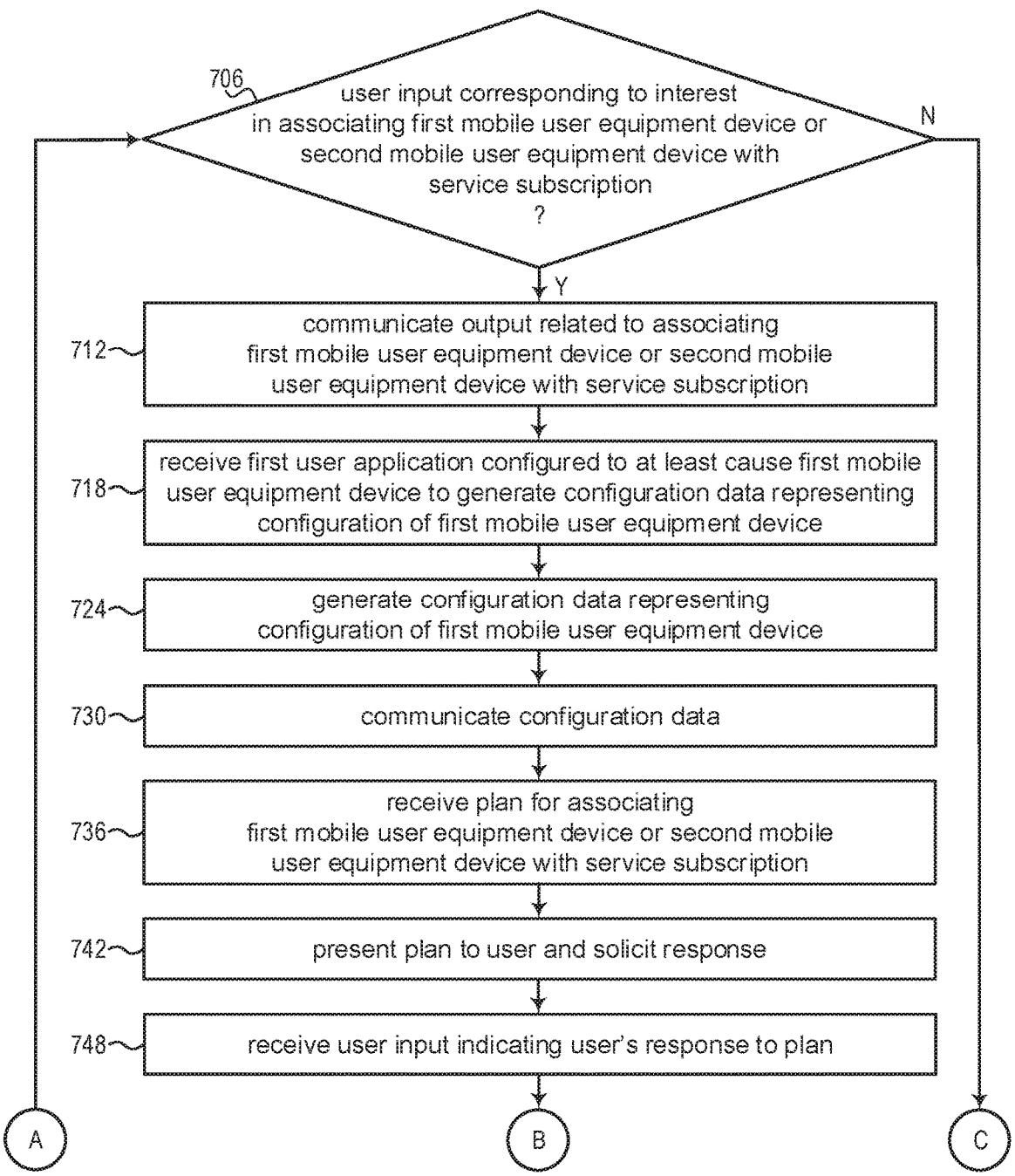
FIGS. 7A-7B are a flow chart illustrating a client method according to an embodiment of the disclosure.
Figure 7B:
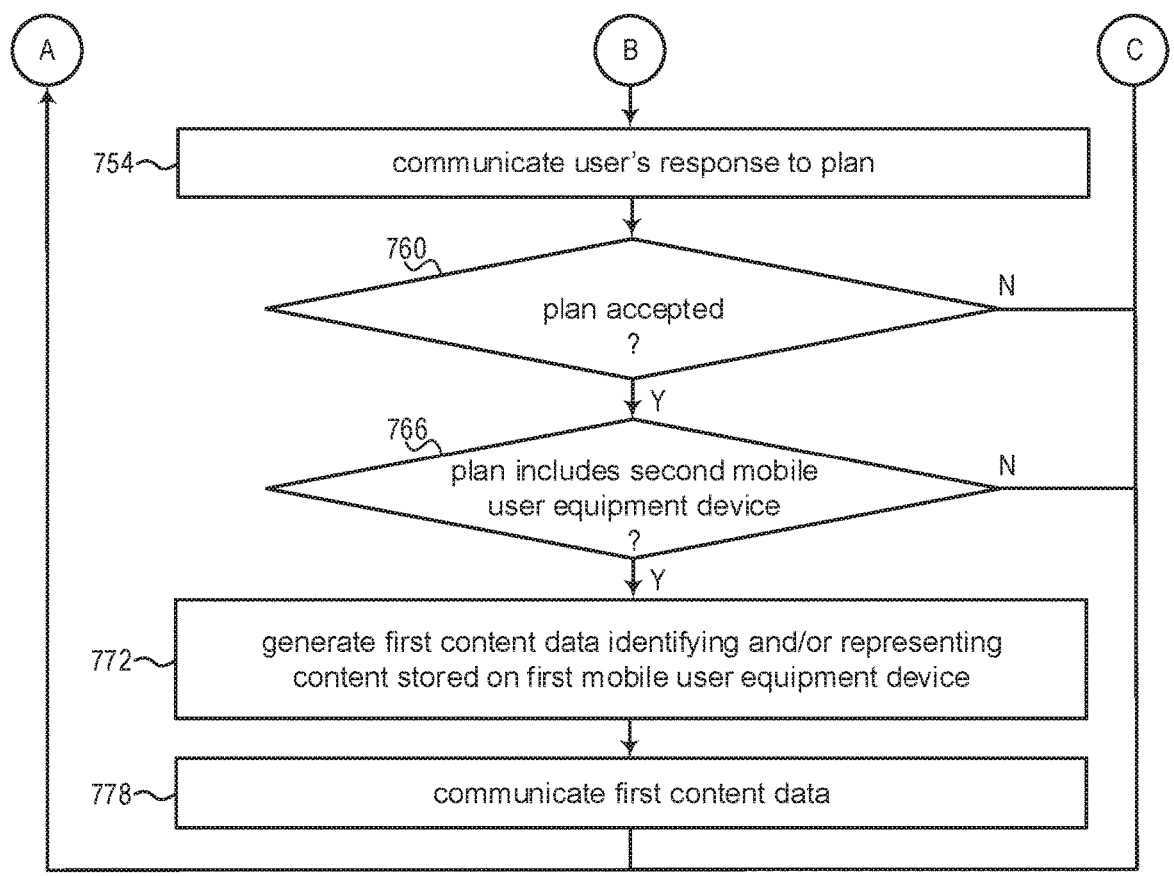

FIGS. 7A-7B are a flow chart illustrating a client method 700 according to an embodiment of the disclosure. In some instances, one or more steps of the method 700 may be performed by one or more of the systems and/or components described herein. For clarity of exposition, the following description may refer to one or more of such systems and/or components. Nevertheless, it should be appreciated that the method 700 and/or any one or more of its particular steps may be performed by any suitable system(s) and/or component(s). It should also be appreciated that the method 700 may be performed concurrently or substantially concurrently with any other method(s) and/or process(es) described herein.

At step 706, the method 700 determines whether user input corresponding to an interest in associating a first mobile user equipment device or a second mobile user equipment device with a service subscription offered by a desired mobile network operator has been received. For example, when using the network environment 100, one of the MUE devices 118 may receive input from one of the users 136 indicating: (1) an interest in bringing that one of the MUE devices 118 into a new service subscription with a mobile network operator that has not been providing services to/through that one of the MUE devices 118 (i.e., indicating that one of the users 136 wants to bring her or his own device into a new relationship with a different mobile network operator than the mobile network operator that has been providing services to that device, or, i.e., the user wants to switch carriers but keep the same device); (2) an interest in using some other BYOD device or a mobile network operator provided device to replace that one of the MUE devices 118 in/on an existing service subscription with a mobile network operator that has been providing services to/through that one of the MUE devices 118 (i.e., the user wants to switch devices but keep the same carrier); or (3) any other suitable interest in associating a first mobile user equipment device or a second mobile user equipment device with a service subscription offered by the desired mobile network operator. If the method 700 determines that user input corresponding to an interest in associating a first mobile user equipment device or a second mobile user equipment device with a service subscription offered by a desired mobile network operator has been received, then the method 700 goes to step 712; otherwise, the method 700 repeats step 706.

At step 712, the method 700 communicates an output related to associating a first mobile user equipment device or a second mobile user equipment device with a service subscription offered by a desired mobile network operator. For example, when using the network environment 100, the one of the MUE devices 118 (referred to above, e.g., at step 706) may communicate a message (through the cell site 120 and the network 112), to one of the server devices 130, indicating that the corresponding one of the users 136 has made an input into that one of the MUE devices 118 corresponding to an interest in associating that one of the MUE devices 118 or a second mobile user equipment device with a service subscription offered by a desired mobile network operator. After step 712, the method 700 goes to step 718 (described below).

At step 718, the method 700 receives a first user application configured to at least cause the first mobile user equipment device to generate configuration data representing a configuration of the first mobile user equipment device. For example, when using the network environment 100, one of the server devices 130 may download, through (i.e., "over") the network 112 and the cell site 120, to the one of the MUE devices 118 (referred to above, e.g., at step 706 and step 712), a user application that is configured to at least cause that one of the MUE devices 118 to generate configuration data identifying and/or representing the radio-frequency communications bands supported by that one of the MUE devices 118, the operating system, user application(s), contacts information, photographs, and/or other content running and/or stored on that one of the MUE devices 118, whether that one of the MUE devices 118 has been rooted, and/or any other suitable configuration of that one of the MUE devices 118. And, hence, that one of the MUE devices 118 may receive the user application. After step 718, the method 700 goes to step 724 (described below).

At step 724, the method 700 generates the configuration data representing the configuration of the first mobile user equipment device. For example, when using the network environment 100, the user application (referred to above, e.g., at step 718) may cause the one of the MUE devices 118 (referred to above, e.g., at step 706, step 712, and step 718) to generate the configuration data (described above, e.g., at step 718). After step 724, the method 700 goes to step 730 (described below).

At step 730, the method 700 communicates the configuration data. For example, when using the network environment 100, the user application (referred to above, e.g., at step 718) may cause the one of the MUE devices 118 (referred to above, e.g., at step 706, step 712, and step 718) to communicate the configuration data (described above, e.g., at step 718), through the cell site 120 and the network 112, to the one or more server devices 130. After step 730, the method 700 goes to step 736 (described below).

At step 736, the method 700 receives a plan for associating the first mobile user equipment device or second mobile user equipment device with a service subscription offered by the desired mobile network operator. For example, when using the network environment 100, one of the server devices 130 may communicate the plan (referred to above, e.g., at step 630 of the method 600) to the one of the MUE devices 118 (referred to above, e.g., at step 706, step 712, and step 718). And, hence, that one of the MUE devices 118 may receive the plan. After step 736, the method 700 goes to step 742 (described below).

At step 742, the method 700 presents the plan to the user and solicits the user's response to the plan. For example, when using the network environment 100, the user application (referred to above, e.g., at step 718) may cause the one of the MUE devices 118 (referred to above, e.g., at step 706, step 712, and step 718) to display the plan (referred to above, e.g., at step 736) for perusal by the corresponding one of the users 136 and may cause that one of the MUE devices 118 to prompt the corresponding one of the users 136 for input indicating whether that one of the users 136 accepts or rejects the plan. After step 742, the method 700 goes to step 748 (described below).

At step 748, the method 700 receives user input indicating the user's response to the plan. For example, when using the network environment 100, the user application (referred to above, e.g., at step 718) may cause the one of the MUE devices 118 (referred to above, e.g., at step 706, step 712, and step 718) to receive input from the corresponding one of the users 136 indicating whether that one of the users 136 accepts or rejects the plan (received at step 736, above). After step 748, the method 700 goes to step 754 (described below).

At step 754, the method 700 communicates the user's response to the plan. For example, when using the network environment 100, the user application (referred to above, e.g., at step 718) may cause the one of the MUE devices 118 (referred to above, e.g., at step 706, step 712, and step 718) to communicate the user's 136 response to the plan (referred to above, e.g., at step 748), through the cell site 120 and the network 112, to the one or more server devices 130. After step 754, the method 700 goes to step 760 (described below).

At step 760, the method 700 determines whether the plan has been accepted. For example, when using the network environment 100, the user application (referred to above, e.g., at step 718) may cause the one of the MUE devices 118 (referred to above, e.g., at step 706, step 712, and step 718) to determine from the user's input (received at step 748, above) whether the user 136 has accepted the plan. If the method 700 determines that the plan has been accepted, then the method 700 goes to step 766; otherwise, the method 700 goes to step 706 (described above).

At step 766, the method 700 determines whether the plan includes associating a second mobile user equipment device with a service subscription offered by the desired mobile network operator. For example, when using the network environment 100, the user application (referred to above, e.g., at step 718) may cause the one of the MUE devices 118 (referred to above, e.g., at step 706, step 712, and step 718) to examine the plan (received at step 736, above) and determine whether the plan includes associating a second mobile user equipment device with a service subscription offered by the desired mobile network operator. If the method 700 determines that the plan includes associating a second mobile user equipment device with a service subscription offered by the desired mobile network operator, then the method 700 goes to step 772; otherwise, the method 700 goes to step 706 (described above).

At step 772, the method 700 generates first content data identifying and/or representing content stored on first mobile user equipment device. For example, when using the network environment 100, the user application (referred to above, e.g., at step 718) may cause the one of the MUE devices 118 (referred to above, e.g., at step 706, step 712, and step 718) to generate the content data (e.g., the content data requested at step 654 of the method 600, described above). After step 772, the method 700 goes to step 778 (described below).

At step 778, the method 700 communicates the first content data. For example, when using the network environment 100, the user application (referred to above, e.g., at step 718) may cause the one of the MUE devices 118 (referred to above, e.g., at step 706, step 712, and step 718) to communicate the first content data (referred to above, e.g., at step 772), through the cell site 120 and the network 112, to the one or more server devices 130. After step 778, the method 700 goes to step 706 (described above).

Figure 8:
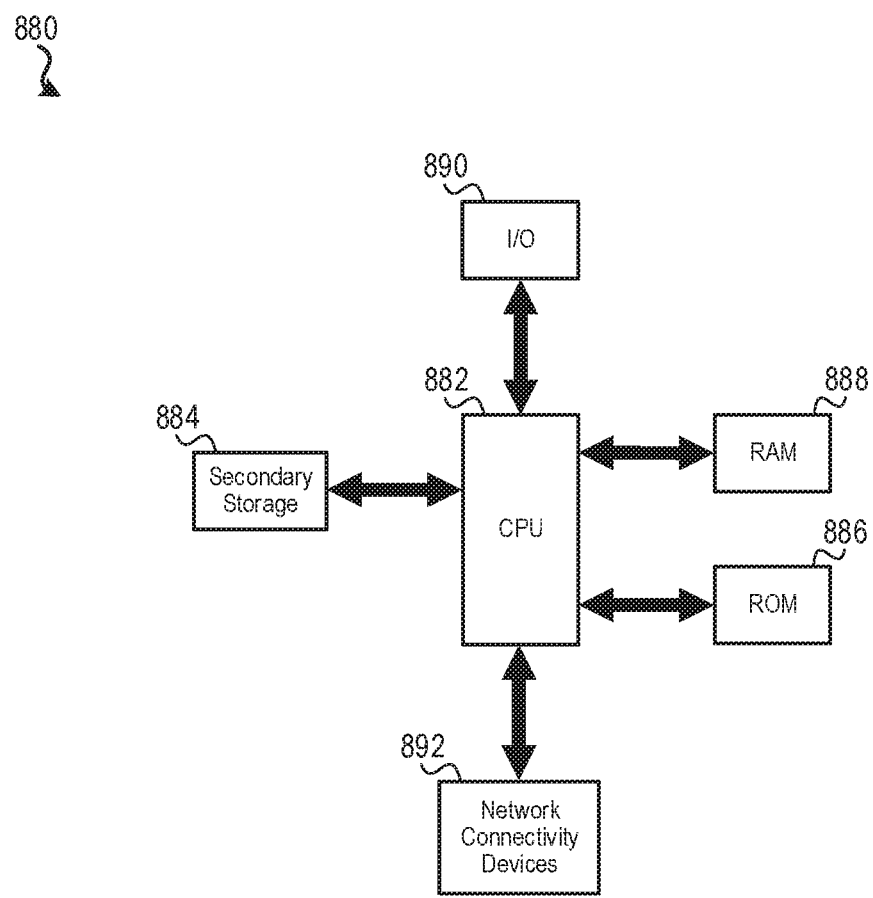
FIG. 8 is a block diagram illustrating a computer system suitable for implementing one or more embodiments disclosed herein.

FIG. 8 is a block diagram of a computer system 880 suitable for implementing one or more embodiments disclosed herein. The computer system 880 includes a processor 882 (which may be referred to as a central processor unit or CPU) that is in communication with memory devices including secondary storage 884, read only memory (ROM) 886, random access memory (RAM) 888, input/output (I/O) devices 890, and network connectivity devices 892. The processor 882 may be implemented as one or more CPU chips.

It is understood that by programming and/or loading executable instructions onto the computer system 880, at least one of the CPU 882, the RAM 888, and the ROM 886 are changed, transforming the computer system 880 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 880 is turned on or booted, the CPU 882 may execute a computer program or application. For example, the CPU 882 may execute software or firmware stored in the ROM 886 or stored in the RAM 888. In some cases, on boot and/or when the application is initiated, the CPU 882 may copy the application or portions of the application from the secondary storage 884 to the RAM 888 or to memory space within the CPU 882 itself, and the CPU 882 may then execute instructions that the application is comprised of. In some cases, the CPU 882 may copy the application or portions of the application from memory accessed via the network connectivity devices 892 or via the I/O devices 890 to the RAM 888 or to memory space within the CPU 882, and the CPU 882 may then execute instructions that the application is comprised of. During execution, an application may load instructions into the CPU 882, for example load some of the instructions of the application into a cache of the CPU 882. In some contexts, an application that is executed may be said to configure the CPU 882 to do something, e.g., to configure the CPU 882 to perform the function or functions promoted by the subject application. When the CPU 882 is configured in this way by the application, the CPU 882 becomes a specific purpose computer or a specific purpose machine.

The secondary storage 884 is typically comprised of one or more disk drives or tape drives and is used for non-volatile storage of data and as an over-flow data storage device if RAM 888 is not large enough to hold all working data. Secondary storage 884 may be used to store programs which are loaded into RAM 888 when such programs are selected for execution. The ROM 886 is used to store instructions and perhaps data which are read during program execution. ROM 886 is a non-volatile memory device which typically has a small memory capacity relative to the larger memory capacity of secondary storage 884. The RAM 888 is used to store volatile data and perhaps to store instructions. Access to both ROM 886 and RAM 888 is typically faster than to secondary storage 884. The secondary storage 884, the RAM 888, and/or the ROM 886 may be referred to in some contexts as computer readable storage media and/or non-transitory computer readable media.

I/O devices 890 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 892 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 892 may provide wired communications links and/or wireless communications links (e.g., a first network connectivity device 892 may provide a wired communications link and a second network connectivity device 892 may provide a wireless communications link). Wired communications links may be provided in accordance with Ethernet (IEEE 802.3), Internet protocol (IP), time division multiplex (TDM), data over cable system interface specification (DOCSIS), wave division multiplexing (WDM), and/or the like. In an embodiment, the radio transceiver cards may provide wireless communications links using protocols such as code division multiple access (CDMA), global system for mobile communications (GSM), long-term evolution (LTE), Wi-Fi (IEEE 802.11), Bluetooth, Zigbee, narrowband Internet of things (NB IoT), near field communications (NFC), and/or radio frequency identity (RFID). The radio transceiver cards may promote radio communications using 5G, 5G New Radio, or 5G LTE radio communications protocols. These network connectivity devices 892 may enable the processor 882 to communicate with the Internet or one or more intranets. With such a network connection, it is contemplated that the processor 882 might receive information from the network, or might output information to the network in the course of performing the above-described method steps. Such information, which is often represented as a sequence of instructions to be executed using processor 882, may be received from and outputted to the network, for example, in the form of a computer data signal embodied in a carrier wave.

Such information, which may include data or instructions to be executed using processor 882 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 882 executes instructions, codes, computer programs, scripts which it accesses from hard disk, floppy disk, optical disk (these various disk based systems may all be considered secondary storage 884), flash drive, ROM 886, RAM 888, or the network connectivity devices 892. While only one processor 882 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 884, for example, hard drives, floppy disks, optical disks, and/or other device, the ROM 886, and/or the RAM 888 may be referred to in some contexts as non-transitory instructions and/or non-transitory information.

In an embodiment, the computer system 880 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 880 to provide the functionality of a number of servers that is not directly bound to the number of computers in the computer system 880. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 880, at least portions of the contents of the computer program product to the secondary storage 884, to the ROM 886, to the RAM 888, and/or to other non-volatile memory and volatile memory of the computer system 880. The processor 882 may process the executable instructions and/or data structures in part by directly accessing the computer program product, for example by reading from a CD-ROM disk inserted into a disk drive peripheral of the computer system 880. Alternatively, the processor 882 may process the executable instructions and/or data structures by remotely accessing the computer program product, for example by downloading the executable instructions and/or data structures from a remote server through the network connectivity devices 892. The computer program product may comprise instructions that promote the loading and/or copying of data, data structures, files, and/or executable instructions to the secondary storage 884, to the ROM 886, to the RAM 888, and/or to other non-volatile memory and volatile memory of the computer system 880.

In some contexts, the secondary storage 884, the ROM 886, and the RAM 888 may be referred to as a non-transitory computer readable medium or a computer readable storage media. A dynamic RAM embodiment of the RAM 888, likewise, may be referred to as a non-transitory computer readable medium in that while the dynamic RAM receives electrical power and is operated in accordance with its design, for example during a period of time during which the computer system 880 is turned on and operational, the dynamic RAM stores information that is written to it. Similarly, the processor 882 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for associating one of a first mobile user equipment device and a second mobile user equipment device with a service subscription offered by a mobile network operator, the method comprising:
   communicating, to the first mobile user equipment device, a first user application configured to at least cause the first mobile user equipment device to generate configuration data representing a configuration of the first mobile user equipment device;
   making an assessment, based at least in part on the configuration data, of at least one compatibility selected from the group consisting of
      a compatibility between a communication service supported by the mobile network operator and an operational characteristic of the first mobile user equipment device, and
      a compatibility between the second mobile user equipment device and a content characteristic of the first mobile user equipment device;
   getting a plan, the plan being based at least in part on the assessment, for associating one of the first mobile user equipment device and the second mobile user equipment device with the service subscription; and
   communicating the plan to the first mobile user equipment device.

2. The method of claim 1, wherein the plan includes at least one strategy selected from the group consisting of associating the second mobile user equipment device with the service subscription rather than associating the first mobile user equipment device with the service subscription, uploading, over the Internet, first content data representing content stored on the first mobile user equipment device, generating, in a format compatible with the second mobile user equipment device, second content data representing the content stored on the first mobile user equipment device, and abandoning the content stored on the first mobile user equipment device.

3. The method of claim 2, further comprising:

receiving feedback data corresponding to an efficacy of the plan; and modifying the plan based at least in part on the feedback data.

4. The method of claim 1, wherein the plan includes data representing a uniform resource locator.

5. The method of claim 1, further comprising:

receiving input related to associating a device with the service subscription, the device being selected from the group consisting of the first mobile user equipment device and the second mobile user equipment device, wherein communicating the plan to the first mobile user equipment device includes communicating the plan, responsive to the input, to the first mobile user equipment device.

6. The method of claim 5, further comprising:

receiving feedback data corresponding to an efficacy of the plan; and modifying the plan based at least in part on the feedback data.

7. The method of claim 5, wherein the plan includes at least one strategy selected from the group consisting of associating the second mobile user equipment device with the service subscription rather than associating the first mobile user equipment device with the service subscription, uploading, over the Internet, first content data representing content stored on the first mobile user equipment device, generating, in a format compatible with the second mobile user equipment device, second content data representing the content stored on the first mobile user equipment device, and abandoning the content stored on the first mobile user equipment device.

8. The method of claim 7, wherein the operational characteristic of the first mobile user equipment device includes at least one characteristic selected from the group consisting of a radio-frequency communications operating band, an operating system, a rooted operating state, and a business network security feature.

9. The method of claim 7, wherein the content characteristic of the first mobile user equipment device includes at least one characteristic selected from the group consisting of a characteristic of a photograph, a characteristic of contacts data, and a characteristic of a second user application.

10. A method for associating one of a first mobile user equipment device and a second mobile user equipment device with a service subscription offered by a mobile network operator, the method comprising:

receiving input related to associating a device with the service subscription, the device being selected from the group consisting of the first mobile user equipment device and the second mobile user equipment device;

receiving, over the Internet, first content data representing content stored on the first mobile user equipment device;

generating, in a format compatible with the second mobile user equipment device, second content data representing the content stored on the first mobile user equipment device; and downloading the second content data over the Internet, responsive to the input, to the second mobile user equipment device.

11. The method of claim 10, further comprising communicating, to the first mobile user equipment device, a first user application configured to at least cause the first mobile user equipment device to upload, over the Internet, the first content data.

12. The method of claim 11, wherein communicating the first user application to the first mobile user equipment device includes communicating the first user application, responsive to the input, to the first mobile user equipment device.

13. A system for associating one of a first mobile user equipment device and a second mobile user equipment device with a service subscription offered by a mobile network operator, the system comprising:

a memory having instructions therein; and at least one processor in communication with the memory, wherein the at least one processor is configured to execute the instructions to:

communicate, to the first mobile user equipment device, a first user application configured to at least cause the first mobile user equipment device to generate configuration data representing a configuration of the first mobile user equipment device, make an assessment, based at least in part on the configuration data, of at least one compatibility selected from the group consisting of a compatibility between a communication service supported by the mobile network operator and an operational characteristic of the first mobile user equipment device, and a compatibility between the second mobile user equipment device and a content characteristic of the first mobile user equipment device, get a plan, the plan being based at least in part on the assessment, for associating one of the first mobile user equipment device and the second mobile user equipment device with the service subscription, and communicate the plan to the first mobile user equipment device.

14. The system of claim 13, wherein the at least one processor is also configured to execute the instructions to include, in the plan, data representing a uniform resource locator.

15. The system of claim 13, wherein the at least one processor is also configured to execute the instructions to include, in the plan, at least one strategy selected from the group consisting of associating the second mobile user equipment device with the service subscription rather than associating the first mobile user equipment device with the service subscription, uploading, over the Internet, first content data representing content stored on the first mobile user equipment device, generating, in a format compatible with the second mobile user equipment device, second content data representing the content stored on the first mobile user equipment device, and abandoning the content stored on the first mobile user equipment device.

16. The system of claim 15, wherein the at least one processor is also configured to execute the instructions to:

receive feedback data corresponding to an efficacy of the plan, and modify the plan based at least in part on the feedback data.

17. The system of claim 15, wherein the at least one processor is also configured to execute the instructions to:

receive input related to associating a device with the service subscription, the device being selected from the group consisting of the first mobile user equipment device and the second mobile user equipment device, and communicate the plan, responsive to the input, to the first mobile user equipment device.

18. The system of claim 17, wherein the operational characteristic of the first mobile user equipment device includes at least one characteristic selected from the group consisting of a radio-frequency communications operating band, an operating system, a rooted operating state, and a business network security feature.

19. The system of claim 17, wherein the content characteristic of the first mobile user equipment device includes at least one characteristic selected from the group consisting of a characteristic of a photo, a characteristic of contacts data, and a characteristic of a second user application.

20. The system of claim 15, wherein the at least one processor is also configured to execute the instructions to:

receive input related to associating a device with the service subscription, the device being selected from the group consisting of the first mobile user equipment device and the second mobile user equipment device, communicate the first user application, responsive to the input, to the first mobile user equipment device, receive, over the Internet, the first content data, generate, in the format compatible with the second mobile user equipment device, the second content data representing the content stored on the first mobile user equipment device, and download the second content data, over the Internet, to the second mobile user equipment device, wherein the first user application is also configured to at least cause the first mobile user equipment device to upload, over the Internet, the first content data.

\* \* \* \* \*